United States Patent [19]

Tomihara et al.

[11] Patent Number: 5,352,308
[45] Date of Patent: Oct. 4, 1994

[54] SELF-LOCKING AGENT

[75] Inventors: Kenichi Tomihara; Naoki Sato; Minami Hanada; Isao Noguchi; Yumi Oka, all of Hachioji, Japan

[73] Assignee: Three Bond Co., Ltd., Tokyo, Japan

[21] Appl. No.: 72,167

[22] Filed: Jun. 4, 1993

Related U.S. Application Data

[63] Continuation of Ser. No. 587,398, Sep. 25, 1990, abandoned.

[51] Int. Cl.$^5$ .............. B32B 7/08; C08K 9/10
[52] U.S. Cl. .................................. 156/66; 156/71; 156/92; 156/330; 428/355; 428/402.2
[58] Field of Search .................. 428/355, 402.2; 528/146; 156/66, 71, 92, 330

[56] References Cited

U.S. PATENT DOCUMENTS

| | | | |
|---|---|---|---|
| 3,928,230 | 12/1975 | Unsworth | 252/316 |
| 4,164,971 | 8/1979 | Strand | 151/14.5 |
| 4,447,586 | 5/1984 | Shimp | 525/504 |
| 4,536,524 | 8/1985 | Hart | 523/176 |
| 4,775,736 | 10/1988 | Wiggins | 528/91 |
| 4,808,639 | 2/1989 | Chernack | 523/211 |
| 4,940,852 | 7/1990 | Chernack | 523/211 |
| 5,000,636 | 3/1991 | Wallace | 411/258 |
| 5,041,668 | 8/1991 | Nalepa | 564/330 |

FOREIGN PATENT DOCUMENTS 58189031 11/1983 Japan.

Primary Examiner—Jenna L. Davis
Attorney, Agent, or Firm—Scully, Scott, Murphy & Presser

[57] ABSTRACT

A self-locking agent for a fastening device comprises a microencapsulated adhesive composition comprising the following constituents (a) to (c):

(a) an epoxy compound having at least two epoxy groups, (b) an aromatic diamine represented by the following formula (a) or (b):

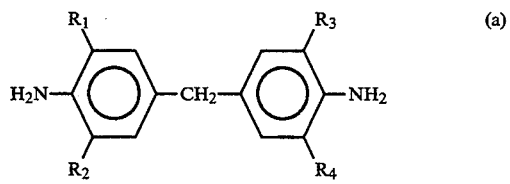

wherein $R_1$ to $R_4$ each represent $CH_3$, $C_2H_5$, $C_3H_7$, $CH(CH_3)_2$, $C_4H_9$ or a halogen, or

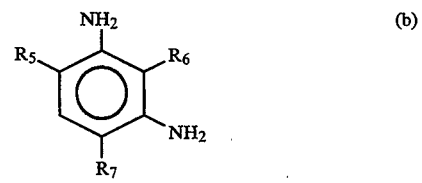

wherein $R_5$ to $R_7$ each represent $CH_3$, $C_2H_5$, $C_3H_7$ or a halogen, and (c) at least one compound selected from the group consisting of thiosalicylic acid, salicylic acid, benzoic anhydride, boron trifluoride and boron trifluoride complexes, wherein at least one of the epoxy compound (a) and aromatic diamine (b) is microencapsulated to keep them apart from each other, said self-locking agent has excellent thermal resistance and storage stability.

5 Claims, 1 Drawing Sheet

SELF-LOCKING AGENT

This is a continuation of copending application Ser. No. 587,398, filed on Sep. 25, 1990, now abandoned.

BACKGROUND OF THE INVENTION

1. Field of the Invention

The present invention relates to a self-locking agent to be applied to an engaging part of a fastening device to secure that part by engaging and also to a fastening device coated with the self-locking agent.

2. Prior Art

Adhesives to be used for securing the engaging part of a fastening device by bonding generally include the following adhesives (1) to (3):

(1) an anaerobic adhesive mainly comprising an acrylic or methacrylic ester and a polymerization initiator, (2) a precoat-type adhesive prepared by microencapsulating the same anaerobic adhesive as the above-described one (1), making the microcapsules with a catalyst, filler, binder, etc., applying the resulting mixture to the engaging part of a fastening device and drying it, and (3) a precoat-type adhesive prepared by mixing microcapsules of an epoxy polymer with a hardener, filler and binder, applying the mixture to the engaging part of a fastening device and drying it.

However, these prior art techniques have each problems which will now be described.

The adhesive (1) is difficult to apply to a fastening device in a predetermined amount, because it is liquid. Further it is also difficult and costly to incorporate an application for the adhesive into the production line. In addition, the hardening of the adhesive when applied to, for example, a resin screw is insufficient, since the presence of a metal ion is indispensable for the hardening of the anaerobic adhesive. Since the resin squeezed out of the threaded part will not easily be hardened, it says or volatilizes to adhere to other parts, thus exerting a bad influence on the quality of the product.

The precoat-type adhesive (2) is one developed to solve the problems of the adhesive (1). Although the workability thereof was improved, the quality of the product is deteriorated when no metal ion is present on the surface of an object, since a hardening adhesive composition similar to the composition (1) is used.

The precoat-type adhesive (3) is one improved in the workability in application and the hardenability of the squeezed resin, but irritates the skin and has toxicity such as mutagenicity, since it contains an aliphatic or alicyclic polyamine used as the hardener. Further its thermal resistance and long-term stability are insufficient.

An object of the present invention is to overcome the above-described defects of the prior art techniques and, in particular, to provide a self-locking agent for a fastening device which has excellent thermal resistance and storage stability and also a fastening device coated with the self-locking agent.

SUMMARY OF THE INVENTION

The present invention provides a self-locking agent for a fastening device, comprising:

(a) an epoxy compound having at least two epoxy groups, (b) an aromatic diamine represented by the following formula (a) or (b):

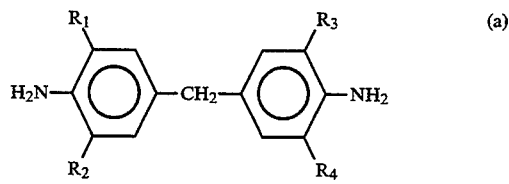

(a)

wherein $R_1$ to $R_4$ each represent $CH_3$, $C_2H_5$, $C_3H_7$, $CH(CH_3)_2$, $C_4H_9$ or a halogen, or

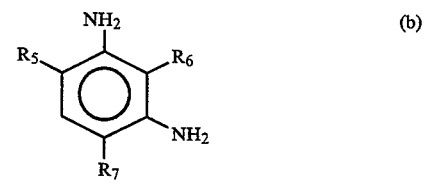

(b)

wherein $R_5$ to $R_7$ each represent $CH_3$, $C_2H_5$, $C_3H_7$ or a halogen, and (c) at least one compound selected from the group consisting of thiosalicylic acid, salicylic acid, benzoic anhydride, boron trifluoride and boron trifluoride complexes, wherein at least one of the epoxy compound (a) and aromatic diameter (b) is microencapsulated to keep them apart each other.

The self-locking agent of the present invention usually further contains:

(d) a binder.

The self-locking agent of the present invention preferably contains:

(e) a phosphoric ester.

The present invention provides also a fastening device coated with the self-locking agent.

BRIEF DESCRIPTION OF THE DRAWING

The FIGURE illustrates a fastening device coated with the self-locking agent of the present invention, wherein reference numeral 1 refers to a bolt, 2 to a nut, 3 and 5 to threaded parts, 4 to a self-locking agent and 6 to a microcapsule.

DETAILED DESCRIPTION OF THE INVENTION

Figure 1:
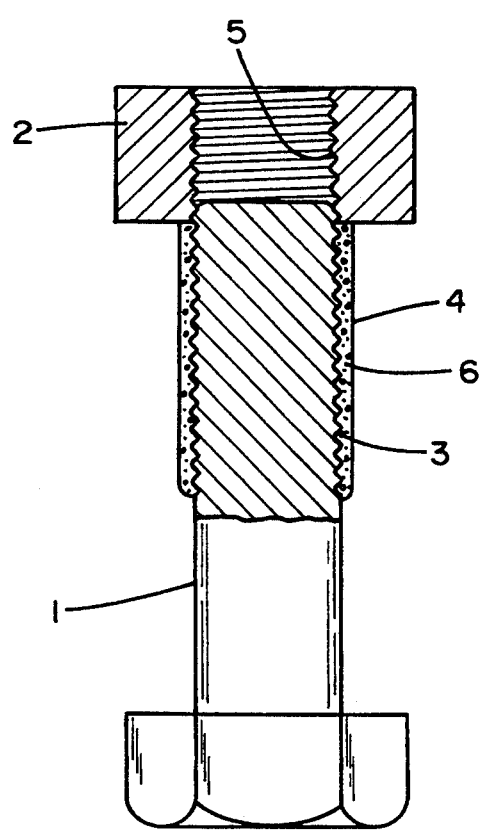

The adhesive composition used as the self-locking agent for a fastening device according to the present invention comprises as the indispensable components at least an epoxy resin (a), an aromatic diamine (b), and thiosalicylic acid, salicylic acid, benzoic anhydride, boron trifluoride or a boron trifluoride complex (c). Usually it further contains a binder (d) and, if necessary, a phosphoric ester (e), a filler, a solvent, etc.

The term "to microencapsulate an adhesive composition" as used in this specification is intended to mean microencapsulating the whole or a part of the substances constituting the adhesive as will be described below. It is essential in the present invention to microencapsulate only one of the epoxy compound and the aromatic diamine or both of them separately to keep them apart from each other.

The epoxy compound (resin) to be used in the present invention is one having at least two epoxy groups in the molecule, and examples thereof include bisphenol A epoxy resins, bisphenol F epoxy resins, cresol novolak epoxy resins, phenol novolak epoxy resins, cycloaliphatic epoxy resins, glycidylamine epoxy resins, bromobisphenol A epoxy resins and bromophenol novolak epoxy resins. These epoxy resins may be used either singly or in the form of a mixture of two or more of them.

These epoxy resins may contain, if necessary, reactive diluents such as butyl glycidyl ether or an epoxy monomer having at least one epoxy group in the molecule or an unreactive diluent such as a xylene resin.

The aromatic diamine of the above formula (a) or (b) is used as a hardener for the epoxy resin.

The aromatic diamines of the above formula (a) include 4,4'-diamino-3,3',5,5'-tetramethyldiphenylmethane, 4,4'-diamino-3,3',5,5'-tetraethyldiphenylmethane, 4,4'-diamino-3,3',5,5'-tetraisopropyldiphenylmethane, 4,4'-diamino-3,3',5,5'-tetra-n-propyldiphenylmethane, 4,4'-diamino-3,3'-dimethyl-5,5'-diethyldiphenylmethane, 4,4'-diamino-3,3'-dimethyl-5,5'-diisopropyldiphenylmethane, 4,4'-diamino-3,3'-dimethyl-5,5'-di-n-propylisopropyldiphenylmethane, 4,4'-diamino-3,3'-diethyl-5,5'-diisopropyldiphenylmethane, 4,4'-diamino-3,3',5,5'-tetrachlorodiphenylmethane, 4,4'-diamino-3,3',5,5'-tetrabromodiphenylmethane, 4,4'-diamino-3,3'-dichloro-5,5'-dimethyldiphenylmethane, 4,4'-diamino-3,3'-dichloro-5,5'-diethyidiphenylmethane, 4,4'-diamino-3,3'-dichloro-5,5'-diisopropyldiphenylmethane, 4,4'-diamino-3,3'-dibromo-5,5'-dimethyldiphenylmethane, 4,4'-diamino-3,3'-dibromo-5,5'-diethyldiphenylmethane, 4,4'-diamino-3,3'-dibromo-5,5'-diisopropyldiphenylmethane and 4,4'-diamino-3,3'-dichloro-5,5'-dibromodiphenylmethane. They may be used either alone or in the form of a mixture of two or more of them.

The aromatic diamines of the above formula (b) include 2-methyl-4,6-diethyl-m-phenylenediamine, 2,4,6-trimethyl-m-phenylenediamine, 6-methyl-2,4-diethyl-m-phenylenediamine, 2,6-dimethyl-4-ethyl-m-phenylenediamine, 4,6-dimethyl-2-ethyl-m-phenylenediamine, 2,4,6-triethyl-m-phenylenediamine, 2,4,6-tripropyl-m-phenylenediamine, 4-propyl-2,6-diethyl-m-phenylenediamine, 2-chloro-4,6-dibromo-m-phenylenediamine, 2,4,6-trichloro-m-phenylenediamine, 6-chloro-2,4-dibromo-m-phenylenediamine, 2,6-dichloro-4-bromo-m-phenylenediamine, 4,6-dichloro-2-bromo-m-phenylenediamine and 2,4,6-tribromo-m-phenylenediamine. They can be used either alone or in the form of a mixture of two or more of them.

By using the aromatic diamine of the formula (a) or (b), the self-locking agent free from the mutagenicity and capable of reducing the gel time in the presence of a solvent can be obtained.

The aromatic diamine is used usually in such an amount that the ratio of the epoxy equivalent of the epoxy resin used to the amine equivalent of the aromatic diamine used is 0.5/1 to 1.5/1.

The component (c) such as thiosalicylic acid used in the present invention acts as a hardening accelerator when the aromatic diamine of the above formula (a) or (b) is used as the hardener for the epoxy resin. Thiosalicylic acid is particularly preferred. The term "thiosalicylic acid" herein includes also substituted thiosalicylic acids in which the benzene nucleus is substituted by chlorine or an alkyl group. In the present invention, salicylic acid, benzoic anhydride, boron trifluoride and complexes thereof (such as a complex thereof with an alkylamine or acetic acid) are also usable. Although these hardening accelerators are capable of hardening the resin at ambient temperature, the thermal resistance of the self-locking agent prepared therefrom is inferior to that prepared from thiosalicylic acid. When thiosalicylic acid is used as the hardening accelerator, a self-locking agent having quite excellent hot strengths and storage stability can be obtained.

The hardening accelerator is used usually in an amount of 5 to 80 parts by weight, preferably 10 to 30 parts by weight, for 100 parts by weight of the aromatic diamine of the formula (a) and/or formula (b). When the amount of the hardening accelerator is less than 5 parts by weight, the hardening velocity at ambient temperature is reduced, while when it exceeds 80 parts by weight, the acceleration reacts with the aromatic diamine to impair the hardening effect thereof.

The phosphoric ester is used for improving the adhesion of the hardened resin to the metal surface, thereby enhancing the securing force of the screw. This effect is particularly remarkable when a nut is precoated with it in the present invention. The phosphoric ester is used usually in an amount of 0.5 to 50%, preferably 1 to 4% by weight, based on the epoxy resin. When the amount of the phosphoric ester is less than 0.5%, no sufficient effect thereof can be obtained, while when it exceeds 50%, the composition causes gelation or its preservability is seriously impaired.

The binder is used for homogeneously dispersing the constituents of the self-locking agent to thereby facilitate adhesion thereof to the engaging part of a fastening device and to hold them. It will suffice when the amount of the binder is such that it can homogeneously disperse the constituents of the self-locking agent to thereby facilitate adhesion thereof to the engaging part of a fastening device and to hold them. The amount thereof is thus not particularly limited. It may be, for example, 3 to 20% by weight based on the solvent. Any binder which is solid at ambient temperature and is nonadhesive, lipophilic, hydrophobic and soluble in the solvent may be used.

Examples of the binder include polyvinyl butyral, vinyl acetate, methyl methacrylate, polyvinyl alcohol, styrene, urea, melamine, polyurethane or one or more copolymers having butyl rubber in the main chain thereof. These binders may be used either singly or in the form of a mixture of two or more of them.

The fillers are suitably selected from known ones. They include inorganic fillers such as alumina, talc and silica, graphite and organic fillers such as polyethylene powder. These fillers may be used either singly or in the form of a mixture of two or more of them.

By incorporating the filler, the thermal resistance of the self-locking agent is improved and the abrasion resistance of the engaging part can be reduced in engaging a fastening device.

The self-locking agent of the present invention may contain a solvent in addition to the above-described constituents. The solvents are those in which the capsule wall is insoluble but the constituents of the self-locking agent (excluding the filler) are soluble. They include aromatic hydrocarbons such as toluene and xylene, and chlorinated hydrocarbons such as trichloroethane and trichloroethylene. These solvents may be used either singly or in the form of a mixture of two or more of them.

Other components such as a hydrolysis inhibitor, stabilizer, coupling agent, ultraviolet stabilizer, colorant and perfume can also be incorporated into the adhesive composition in order to improve the properties of the self-locking agent used in the present invention. Further other additives such as a polymerization inhibitor, ultraviolet protector and antioxidant can be incorporated thereinto for the purpose of maintaining the storage stability of the adhesive composition for a long period of time.

In the self-locking agent of the present invention, the whole or a part of the above-described constituents of the adhesive composition is microencapsulated. The epoxy resin and the aromatic diamine are mixed in such a manner that they do not enter reaction until the microcapsules are broken. They are thus mixed by the following process (1), (2) or (3):

(1) a process wherein a powdery aromatic diamine is mixed with a microencapsulated epoxy resin, (2) a process wherein a microencapsulated aromatic diamine is mixed with a separately microencapsulated epoxy resin, or (3) a process wherein epoxy resin and the aromatic diamine are microencapsulated by a double microencapsulation process described in, for example, Japanese Patent Laid-Open No. 189031/1983.

The phosphoric ester can be mixed with the epoxy resin by, for example, the following process (1), (2) or (3):

(1) a process wherein a mixture of the phosphoric ester with the epoxy resin are is microencapsulated and a binder, solvent, hardener, etc., are added thereto, (2) a process wherein a microencapsulated epoxy resin is mixed with the phosphoric ester, binder, solvent, hardener, etc., or (3) a process wherein a microencapsulated phosphoric ester is mixed with a microencapsulated epoxy resin, binder, solvent, hardener, etc.

The microcapsules used in the present invention can be produced by any known microencapsulation process such as coacervation, interfacial polymerization, or in situ process.

The membrane materials for the microcapsule include gelatin, acacia, sodium alginate, polysodium acrylate, polyvinyl alcohol, polyacrylamide, sodium carboxymethylcellulose, polyether, polyamide, polyurea, epoxy resin, polyurethane and polystyrene.

The size of the microcapsules is such that they will be effectively broken upon engaging and thus varies depending on the shape or size of the screw thread formed on the engaging part. It is thus not particularly limited. It is, for example, about 0.00.5 to 3 mm, preferably 0.01 to 0.3 mm. When it is smaller than 0.005 mm, the microcapsules are difficultly broken, while when it is larger than 3 mm, unhardened parts are formed after the breakage or the handling of the microcapsules becomes inconvenient.

The self-locking agent of the present invention is produced by carefully stirring the above-described constituents with, for example, a mixer.

The engaging part of the fastening device of the present invention is coated with the above-described self-locking agent by, for example, carefully stirring the constituents of the self-locking agent with a mixer to give the adhesive composition, applying said composition to the whole or a part of the engaging part by brushing, dipping or spraying, and air-during the formed coating at ambient temperature of under such a temperature condition that the properties of the adhesive composition are not impaired.

The fastening device coated with the self-locking agent of the present invention is a member having a screw thread, e.g. bolts, nuts, pipe joints, split pins and wood screws, wherein at least two such member are secured to each other by engagement, and other electric, mechanical or construction members which are secured to each other by engagement in such a manner that the capsules of the self-locking agent adherent to a part or the whole surface of one or both of the engaging parts are broken to make effective stirring and mixing of the constituents of the adhesive possible.

Such a fastening device is composed of, for example, a bolt 1 and a nut 2 as shown in the attached FIGURE. When, for example, a self-locking agent 4 is applied to the outer periphery of a screw thread 3 of the bolt 1 and the bolt 1 is engaged with the nut 2 mechanically or by hands, capsules 6 in the self-locking agent 4 are broken and the constituents of the adhesive composition are stirred and mixed together to cause hardening at ambient temperature or even at a lower temperature to secure the screw thread 3 of the bolt 1 to a screw thread 5 of the nut 2 without fail, thereby exhibiting such a self-locking effect that the engaging part thereof will be neither loosened nor released unless a predetermined power is applied thereto.

If necessary, the engaging part is heated after the engagement to further shorten the hardening time of the adhesive composition.

The use of the fastening device coated with the self-locking agent of the present invention serves to shorten the hardening time of the adhesive composition and conduct hardening at a low temperature to secure the engaging part. Since the self-locking agent is air-drying and especially has excellent thermal resistance and storage stability, the reliability of the final product is enhanced. Furthermore, hygienic problems of workers due to the toxicity of the adhesives encountered in the prior art techniques can be solved and the working atmosphere can be improved.

EXAMPLES

The following Examples will further illustrate the present invention.

Examples 1 to 7

The constituents listed in Table 1 were mixed together in relative amounts specified therein to prepare self-locking agents, Each of the self-locking agents was applied to iron bolts (JIS class 2, M 10×P 1.5) by dipping. After leaving them to stand at room temperature and 50% R.H. After leaving them to stand at room temperature and 50% R.H. for 24 h, test pieces were prepared.

The epoxy resin, hardener, hardening accelerator, filler, solvent and binder used are as follows. Microcapsules of epoxy resin:

(they are referred to merely as "capsule" in the column of the composition in Table 1.)

Microcapsules of Epikote 828 (trade name of bisphenol A epoxy resin EEW 189, a product of Yuka Shell Epoxy Co., Ltd.) were prepared by the coacervation process.

Hardener:
A-1: 4,4'-diamino-3,3',5,5'-tetramethyldiobenylmethane,
A-2: 2,4,6-trimethyl-m-phenylenediamine,
a-1: methyliminobispropylamine,
a-2: 4,6-dimethyl-m-phenylenediamine.

Hardening accelerator:
B-1: thiosalicylic acid, b-1: salicylic acid,
b-2: BF₃(CH₃COOH)₂.

Filler:
Mistron Vapor: fine powder of magnesium silicate (a product of Nihon Mistron Co., Ltd.) having a maximum particle diameter of 6 μm and a specific gravity of 2.75.

Solvent:
C-1: mixture of toluene with trichloroethylene in a weight ratio of 4:9.
C-2: toluene.

Binder:
BR-95: one of Dianal BR resins (products of Mitsubishi Rayon Co., Ltd.) (Tg: 80° C., M.W.: 320×10³)

Evaluation test

The test pieces prepared in Examples 1 to 7 were subjected to the following torque test and those prepared in Examples 1, 4, 6 and 7 were subjected to the following stability test.

The results of the torque test are given in Table 2 and those of the stability test in Table 3.

Torque test:
Each of the test pieces was engaged with an iron nut (JIS class 2, pitch 1.5) at a specified torque to break the microcapsules of the self-locking agent applied to the test piece. After leaving under hardening conditions of room temperature and 50% R.H. for 24 h, the hot torque (return torque) was determined at 150° C. after leaving the test piece in a drying oven at 150° C. for one hour. The device used was a torque wrench mfd. by Tonichi Seisakusho Co., Ltd.

Storage stability test:
Some of the test pieces were left to stand in a drying oven it 40° C. for 168 h and then engaged each with a nut (JIS class 2, pitch 1.5) at a specified torque. After leaving them to stand under hardening conditions of room temperature and 50% R.H. for 24 h, the return torque thereof was determined. The device used was a torque wrench mfd. by Tonichi Seisakusho Co., Ltd.

TABLE 1

| Composition | Ex. No. | | | | | | |
|---|---|---|---|---|---|---|---|
| | 1 | 2 | 3 | 4 | 5 | 6 (Comp.) | 7 (Comp.) |
| Capsule | 20 | 20 | 20 | 20 | 20 | 20 | 20 |
| Hardener | | | | | | | |
| A-1 | 5.6 | 5.6 | 5.6 | | | | |
| A-2 | | | | 3.2 | 3.2 | | |
| a-1 | | | | | | 3.05 | |
| a-2 | | | | | | | 2.9 |
| Accelerator | | | | | | | |
| B-1 | 0.64 | | | 0.64 | | | |
| b-1 | | 0.64 | | | 0.64 | | |
| b-2 | | | 0.64 | | | | |
| Filler | 2 | 2 | 2 | 2 | 2 | 2 | 2 |
| Solvent | | | | | | | |
| C-1 | 22.5 | 22.5 | 22.5 | 32.5 | 32.5 | | 22.5 |
| C-2 | | | | | | 22.5 | |
| Binder | 2 | 2 | 2 | 2 | 2 | 2 | 2 |

(unit: g)

TABLE 2

| Specified torque | Return torque (kg f · cm) | | Hot torque (kg f · cm) | |
|---|---|---|---|---|
| | 0 | 300 | 0 | 300 |
| Example 1 | 118 | 567 | 163 | 350 |
| Example 2 | 195 | 530 | 25 | 155 |

TABLE 2-continued

| Specified torque | Return torque (kg f · cm) | | Hot torque (kg f · cm) | |
|---|---|---|---|---|
| | 0 | 300 | 0 | 300 |
| Example 3 | 130 | 510 | 30 | 203 |
| Example 4 | 162 | 512 | 56 | 255 |
| Example 5 | 173 | 517 | 27 | 222 |
| Example 6 | 50 | 483 | 30 | 243 |
| Example 7 | 147 | 440 | 30 | 177 |

It was confirmed from the results of the torque test given in Table 2 that the bolt engaged with the nut coated with the self-locking agent prepared in Example 1 or 4 to secure it with the self-locking agent had a sufficient fastening strength even at a temperature of as high as 150° C. to interlocks the nut without fail. This fact suggested a particularly excellent thermal resistance of the self-locking agent.

TABLE 3

| Specified torque | Return torque (kgf · cm) | |
|---|---|---|
| | 0 | 300 |
| Example 1 | 182 | 560 |
| Example 4 | 157 | 540 |
| Example 6 | 0 | 267 |
| Example 7 | 93 | 370 |

It was confirmed from the results of the storage stability test given in Table 3 that the self-locking agents of Example 1 and 4 had a return torque value far higher than that of the adhesive composition of Example 6 or 7 and that the bolt engaged with the nut and secured by means of the self-locking agent had a sufficient fastening strength and interlocked the nut without fail. Thus an excellent storage stability of the self-locking agent was confirmed.

Examples 8 to 13

The constituents listed in Table 4 were mixed together in relative amounts specified therein to prepare self-locking agents.

Each of the self-locking agents was applied to iron bolts (JIS class 2, M 10×P 1.5) by dipping. After leaving them to stand under conditions of room temperature and 50% R.H. for 24 h, test pieces of Examples 8-1, 9-1 10-1, 11-1, 12-1 and 13-1 (bolts) and 12-2 and 13-2 (nuts) were prepared. Further each of the self-locking agents was applied to iron nuts (JIS class 2, M 10×P 1.5) by dipping. After leaving them to stand under conditions of room temperature and 50% R.H. for 24 h, test pieces were prepared.

The epoxy resin, hardener, hardening accelerator, filler, solvent and binder used are as follows. Microcapsules of epoxy resin:

(they are referred to merely as "capsule" in the column of the composition in Table 4.)

D-1: microcapsules of Epikote 828 (trade name of bisphenol A epoxy resin EEW 189, a product of Yuka Shell Epoxy Co., Ltd.) prepared by the coacervation process, D-2: microcapsules of a mixture of EPPN-201 (trade name of a phenol novolak epoxy resin: EEW 190, a product of Nippon Kayaku K.K.) with trimethylolpropane polyglycidyl ether in a weight ratio of 2:8, prepared by the coacervation process.

Hardener:
A-1: the same as that of Example 1.

Hardening accelerator:
B-1: the same as that of Example 1.
Additive:
E-1: JPA 514 (trade name of a phosphoric ester of Johoku Kagaku K.K.),
E-2: Kayamer PM-1 (trade name of a phosphoric ester of Nippon Kayaku K.K.)
Filler:
Mistron Vapor: the same as that of Example 1.
Solvent:
C-1: the same as that of Example 1.
Binder:
BR-95: the same as that of Example 1.

Evaluation Test

The test pieces prepared in Examples 8 to 13 were subjected to the following torque test.

The results of the torque test are given in Table 5.

Torque test:

Each of the test pieces prepared in Examples 8-1, 9-1, 10-1 and 11-1 was engaged with an iron nut (JIS class 2, pitch 1.5) at a specified torque, while each of the test pieces prepared in Examples 8-2, 9-2, 10-2 and 11-2 was engaged with an iron bolt (JIS class 2, pitch P 1.5) at a specified torque, to thereby break the microcapsules contained in the self-locking agent applied to the test pieces. After leaving them to stand under hardening conditions of room temperature and 50% R.H. for 48 h, the hot torque was determined at 150° C. after leaving the test piece in a drying oven at 150° C. for one hour. The device used was a torque wrench manufactured by Tonichi Seisakusho Co., Ltd.

TABLE 4

| Composition | Ex. No. | | | | | |
|---|---|---|---|---|---|---|
| | 8 | 9 | 10 | 11 | 12 | 13 |
| Capsule D-1 | 40 | 40 | 40 | | 40 | |
| Capsule D-2 | | | | 40 | | 40 |
| Hardener A-1 | 11.2 | 11.2 | 11.2 | 13 | 11.2 | 13.1 |
| Accelerator B-1 | 1.28 | 1.28 | 1.28 | 1.28 | 1.28 | 1.28 |
| Filler | 4 | 4 | 4 | 4 | 4 | 4 |
| Additive E-1 | 0.32 | 0.64 | 1.28 | | | |
| Additive E-2 | | | | 0.32 | | |
| Solvent C-1 | 65 | 65 | 65 | 65 | 65 | 65 |
| Binder | 4 | 4 | 4 | 4 | 4 | 4 |

(unit: g)

TABLE 5

| Test piece bolt | Return torque (kgf · cm) | Ratio to Example 12 | Ratio to Example 13 |
|---|---|---|---|
| Example 8-1 | 598 | 1.05 | |
| Example 9-1 | 587 | 1.04 | |
| Example 10-1 | 597 | 1.05 | |
| Example 11-1 | 683 | | 1.03 |
| Example 12-1 | 567 | | |
| Example 13-1 | 663 | | |

TABLE 6

| Test piece nut | Return torque (kgf · cm) | Ratio to Example 12 | Ratio to Example 13 |
|---|---|---|---|
| Example 8-2 | 382 | 1.19 | |
| Example 9-2 | 396 | 1.24 | |
| Example 10-2 | 398 | 1.24 | |
| Example 11-2 | 440 | | 1.22 |
| Example 12-2 | 320 | | |

TABLE 6-continued

| Test piece nut | Return torque (kgf · cm) | Ratio to Example 12 | Ratio to Example 13 |
|---|---|---|---|
| Example 13-2 | 362 | | |

It was confirmed from the results of the torque test given in Tables 5 and 6 that when the self-locking agent prepared in Examples 8, 9, 10 or 11 was applied to the nuts, a return torque value far higher than that obtained when the adhesive composition prepared in Example 12 or 13 was used was obtained.

As described above, the self-locking agent for a fastening device of the present invention has an excellent storage stability and when thiosalicylic acid is used as the hardening accelerator, a particularly excellent thermal resistance is obtained. The use of a fastening device coated with the self-locking agent serves to improve the reliability of the final products, solve the hygienic problems of workers due to the toxicity of the adhesive encounter in the prior art techniques and improve the working atmosphere. When a phosphoric ester is added to the self-locking agent, a further enhanced return torque is obtained in addition to the above-described effects.

What is claimed is:

1. A process for enhancing the effectiveness of a fastening device comprising applying a self-locking agent to the engaging portion of a fastening device, said self-locking agent comprising a microencapsulated adhesive composition which includes:
   (a) an epoxy compound having at least two epoxy groups;
   (b) an aromatic diamine selected from the group consisting of

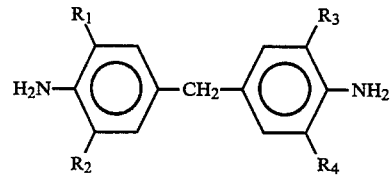

where $R^1$, $R^2$, $R^3$ and $R^4$ are the same or different and are $CH_3$, $C_2H_5$, $C_3H_7$, $CH(CH_3)_2$, $C_4H_9$ or halogen, and

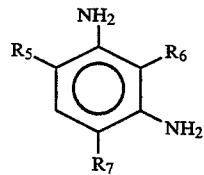

where $R_5$, $R_6$ and $R_7$ are the same or different and are $CH_3$, $C_2H_5$, $C_3H_7$ or halogen; and
   (c) thiosalicylic acid,
with the proviso that at least one of components (a) and (b) is microencapsulated.

2. A process in accordance with claim 1 wherein said microencapsulated adhesive composition includes (d) a binder.

3. A process in accordance with claim 2 wherein said microencapsulated adhesive composition includes (e) a phosphoric ester.

4. A process in accordance with claim 1 wherein component (c) is present in a concentration of 5 to 80 parts by weight per 100 parts by weight of component (b).

5. A process in accordance with claim 1 wherein said fastening device is a member having a screw thread.

* * * * *

UNITED STATES PATENT AND TRADEMARK OFFICE
CERTIFICATE OF CORRECTION

PATENT NO. : 5,352,308
DATED : October 4, 1994
INVENTOR(S) : Kenichi Tomihara, et al.

It is certified that error appears in the above-indentified patent and that said Letters Patent is hereby corrected as shown below:

Column 5, line 63: "air-during" should read --air-drying--

Column 10, line 41, Claim 1: "$R^1$, $R^2$, $R^3$ and $R^4$" should read --$R_1$, $R_2$, $R_3$ and $R_4$--

Signed and Sealed this

Fourth Day of June, 1996

Attest:

BRUCE LEHMAN

Attesting Officer

Commissioner of Patents and Trademarks